Figure 1:

(No Model.)

S. R. ONSTEAD.
WATER CLOSET PAN.

No. 260,602. Patented July 4, 1882.

Fig. 2ª.

Witnesses.
Robert Everett
Jas. E. Hutchinson.

Inventor:
S. R. Onstead.
By James L. Norris.
Atty.

UNITED STATES PATENT OFFICE.

SIDNEY R. ONSTEAD, OF BROOKLYN, NEW YORK, ASSIGNOR OF ONE-HALF TO WILLIAM DEAN, OF SAME PLACE.

WATER-CLOSET PAN.

SPECIFICATION forming part of Letters Patent No. 260,602, dated July 4, 1882.

Application filed May 10, 1882. (No model.)

*To all whom it may concern:*

Be it known that I, SIDNEY R. ONSTEAD, a citizen of the United States, residing at Brooklyn, in the county of Kings and State of New York, have invented new and useful Improvements in Water-Closet Pans, of which the following is a specification.

Heretofore a sheet-metal pan for water-closets has been provided with a lining of celluloid, which is pressed upon or applied while in a liquid state to the bottom portion of the interior of the pan; but the upper edge of the coating or lining has not been protected by a permanent joint with the pan, and hence permits the entrance of water between the lining and the metal bottom of the pan, which is objectionable; but further than this, such linings have been applied while the celluloid is in a hot condition, either plastic or liquid, and consequently on becoming cool it contracts and creates an opening at the point where its upper edge should accurately join the pan, thereby inviting the entrance of water; and, besides, as the celluloid contracts after its application to the pan, it will be obvious that it will become loose and be easily disarranged.

A celluloid bottom for a water-closet pan is very desirable, in that it will effectually resist corrosion, to which such devices are subjected, and which destroys the pan and necessitates frequent expense and inconvenience for repairs or replacement. It has been sought to remedy this objection by the application of a celluloid lining, as before described; but such has been found objectionable and impracticable for the reasons stated. It has also been sought to remedy the corrosion of the pan by lining it with enamel; but the enamel has been found to crack and scale, and thereby prevent the advantages incident to its use. The pan has also been made of earthenware; but, owing to their frangible character and the rough usage to which the pan is subjected, they have been found impracticable. The pan has, further, been provided with an interior bottom of porcelain, secured in place by an annular bead spun against or upon the periphery of the porcelain; but this is open to the objection that it adds considerably to the weight of the pan and is easily cracked or broken; and, further, water can gain access to the metal of the pan under the porcelain, owing to the absence of a perfect joint at the edges thereof.

It will be obvious from the foregoing that a water-closet pan having a bottom composed of celluloid, and so formed and connected with the pan that contraction cannot occur after the celluloid bottom is in position, nor can water possibly find its way to the under side or surface of the celluloid, will be of considerable advantage, importance, value, and practicability in this class of devices. This I accomplish by the means and in the manner which I will now proceed to clearly set forth, reference being had to the accompanying drawings, in which—

Figure 2:
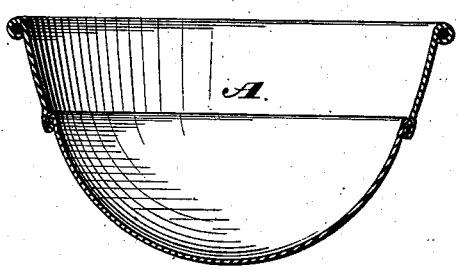
Figure 5:
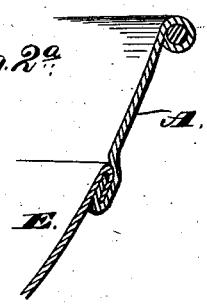
Figure 5:
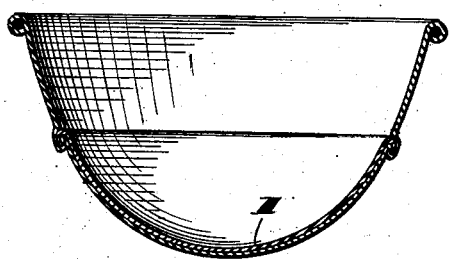
Figure 3:
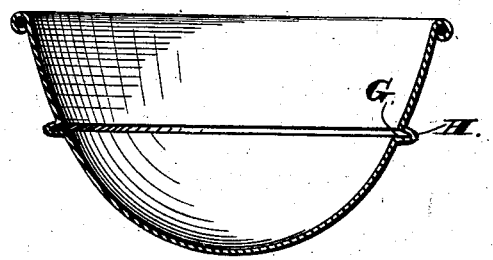
Figure 4:

Figure 1 is a sectional view of a pan composed of two parts—namely, a metal top and a celluloid bottom—the parts being detached; Fig. 2, a sectional view of the two parts united; Fig. 2ª, a sectional view of the connecting joint or seam between the celluloid and the metal, to more clearly illustrate the parts composing the seam as flush with the interior surface of the pan. Figs. 3, 4, and 5 are sectional views, illustrating modifications, which will be hereinafter described.

As shown in Figs. 1 and 2, the water-closet pan is composed of a sheet-metal ring, A, beaded at its upper end, and provided at its lower edge with a shoulder, formed by bending the metal inward and upward to form an annular pocket or channel, C, bounded interiorly by the lip D.

The bottom E is composed of celluloid, formed while in a pliable condition into a concavo-convex shape with an overhanging annular lip, F. The bottom can be formed with the lip through the instrumentality of a male and female die, as will be well understood, and when accurately shaped or fashioned, and after becoming cool, it is passed down through the larger open end of the sheet-metal ring until its annular lip F rests in the pocket or channel C at the smaller lower end of the ring, so that the celluloid bottom will be suspended therefrom. The lips forming this interlocking joint are then subjected to pressure until closely compressed and compacted, forming, as it were, a homogeneous article and a connecting joint or seam, through which it is practically impossible for water to pass or even gain access. The pressing of the seam can be effected by subjecting the parts to the action of a male and female die to bring the seam flush, or substantially so, with the interior surface of the pan thus formed. By first shaping or fashioning the concavo-convex bottom and then securing it in position when cool all liability of the same contracting is avoided, while the edge of the celluloid is confined, held, or clamped in the annular pocket or channel by the metallic part of the pan, thereby providing a strong and substantial union, with no liability of the parts becoming accidentally separated or disarranged, and a pan-bottom is provided which will resist corrosion and permit all the rough usage to which such devices are usually subjected without danger of cracking, scaling, or otherwise becoming broken.

In the pan thus far described the celluloid constitutes in itself the concavo-convex bottom of the pan, and is unsupported, except at its upper edge, where it joins the metal ring.

While such construction provides an efficient pan and accomplishes the object sought, still it may be found desirable to provide the celluloid as a secondary or interior bottom to a pan which is formed with a metal bottom, as shown in Figs. 3 and 5. In this instance the sheet-metal pan is formed with an annular pocket or channel, G, formed by forcing the metal outwardly to constitute a laterally-projecting annular lip, H. The celluloid vessel I is then shaped or fashioned by dies, as hereinbefore stated, into a concavo-convex form, with a lateral lip, J, at its upper edge, and after becoming cool it is inserted into the pan until it rests against the inner surface of the metal bottom and its lip J is sprung into the pocket or channel G, after which the lip H with the lip on the celluloid bottom are turned down and compactly pressed upon or against the metal of the pan, forming a seam which is substantially flush with the interior surface of the pan.

The non-corrosive bottom of the pan may be composed of collodion, or any material substantially the equivalent of collodion, which will resist the corrosive action of the water, &c., which the pan is designed to receive.

What I claim is—

1. A water-closet pan having a concavo-convex bottom of non-corrosive material, which is fashioned into shape, with a lip clamped in an annular pocket or channel formed in the metallic part of the pan.

2. A water-closet pan having a bottom composed of celluloid or collodion formed into a concavo-convex shape, with a lip which is clamped in an annular pocket or channel in the metal part of the pan.

3. In a pan for water-closets, the combination, with the metal part of the pan having an annular pocket or channel, of a celluloid bottom therefor fashioned into a concavo-convex form with an annular lip at its edge which is clamped in the pocket or channel, the joint being compressed, substantially as described.

4. A water-closet pan composed of a metal ring having the annular pocket or channel and lip, and the celluloid bottom suspended therefrom by a lip on its edge clamped in the pocket or channel of the ring, substantially as described.

In testimony whereof I have hereunto set my hand in the presence of two subscribing witnesses.

SIDNEY R. ONSTEAD.

Witnesses:
WILLIAM DEAN,
CHAS. H. BURTIS.